US010776546B2

(12) United States Patent
Pradeep et al.

(10) Patent No.: US 10,776,546 B2
(45) Date of Patent: Sep. 15, 2020

(54) FALSE PATH TIMING EXCEPTION HANDLER CIRCUIT

(71) Applicant: TEXAS INSTRUMENTS INCORPORATED, Dallas, TX (US)

(72) Inventors: Wilson Pradeep, Karanataka (IN); Prakash Narayanan, Karanataka (IN); Saket Jalan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/410,391

(22) Filed: May 13, 2019

(65) Prior Publication Data
US 2019/0266303 A1 Aug. 29, 2019

Related U.S. Application Data

(63) Continuation of application No. 15/630,394, filed on Jun. 22, 2017, now Pat. No. 10,331,826.

(30) Foreign Application Priority Data

Apr. 20, 2017 (IN) .............................. 201741014004

(51) Int. Cl.
G06F 17/50 (2006.01)
G01R 27/28 (2006.01)
G01R 31/28 (2006.01)
G01R 31/36 (2020.01)
G06G 7/62 (2006.01)
(Continued)

(52) U.S. Cl.
CPC .......... *G06F 30/3312* (2020.01); *G06F 30/30* (2020.01); *G06F 30/398* (2020.01); *G01R 27/28* (2013.01); *G01R 31/28* (2013.01); *G01R 31/36* (2013.01); *G06F 30/392* (2020.01); *G06F 30/394* (2020.01); *G06G 7/62* (2013.01);
(Continued)

(58) Field of Classification Search
CPC .... G06F 30/3312; G06F 30/398; G06F 30/30; G06F 30/392; G06F 30/394; G01R 27/28; G01R 31/28; G01R 31/36; G06G 7/62; H01L 23/58; H01L 25/00; H01L 29/10; H03K 19/00
USPC ....... 716/113, 108, 136; 703/16; 702/59, 79; 714/32, 30, 741, 733, 734, 732
See application file for complete search history.

(56) References Cited

U.S. PATENT DOCUMENTS 5,455,832 A * 10/1995 Bowmaster .... G01R 31/318328
370/228
5,675,728 A 10/1997 Kunda et al.
(Continued)

OTHER PUBLICATIONS

Shi et al., "Testing Delay Faults in Asynchronous Handshake Circuits", ACM, 2006, pp. 193-197. (Year: 2006).*

*Primary Examiner* — Phallaka Kik
(74) *Attorney, Agent, or Firm* — Ebby Abraham; Charles A. Brill; Frank D. Cimino

(57) ABSTRACT

A circuit includes a false circuit path in a circuit under test having a starting logic point to an end logic point of the path. The false circuit path is designated as a testing path to be excluded during testing of one or more valid timing paths of the circuit under test. A false path gating circuit gates the starting logic point to the end logic point of the false circuit path. The false path gating circuit disables the false circuit path in response to one or more gating controls asserted during the testing of the one or more valid timing paths of the circuit under test.

2 Claims, 3 Drawing Sheets

(51) Int. Cl.
   G06F 30/3312 (2020.01)
   G06F 30/30 (2020.01)
   G06F 30/398 (2020.01)
   *H01L 23/58* (2006.01)
   *H01L 25/00* (2006.01)
   *H01L 29/10* (2006.01)
   *H03K 19/00* (2006.01)
   *G06F 30/392* (2020.01)
   *G06F 30/394* (2020.01)

(52) U.S. Cl.
   CPC .............. *H01L 23/58* (2013.01); *H01L 25/00* (2013.01); *H01L 29/10* (2013.01); *H03K 19/00* (2013.01)

(56) References Cited

U.S. PATENT DOCUMENTS

| | | | |
|---|---|---|---|
| 5,774,100 A * | 6/1998 | Aoki | G09G 3/006 345/87 |
| 6,083,273 A | 7/2000 | Takeuchi | |
| 6,683,869 B1 * | 1/2004 | Pierson, Jr. | H04L 49/25 370/351 |
| 6,714,902 B1 | 3/2004 | Chao et al. | |
| 7,216,318 B1 | 5/2007 | Siarkowski | |
| 10,331,826 B2 * | 6/2019 | Pradeep | G06F 30/398 |
| 2002/0112213 A1 | 8/2002 | Abadir et al. | |
| 2002/0174407 A1 | 11/2002 | Furusawa | |
| 2003/0048781 A1 * | 3/2003 | Pierson | H04L 49/30 370/389 |
| 2004/0250224 A1 | 12/2004 | Clement et al. | |
| 2005/0223345 A1 | 10/2005 | Furusawa | |
| 2005/0251779 A1 | 11/2005 | Chard et al. | |
| 2006/0123370 A1 | 6/2006 | Vergara-Escobar | |
| 2007/0011527 A1 | 1/2007 | Goswami et al. | |
| 2007/0273343 A1 * | 11/2007 | Pruessmeier | H02M 3/335 323/247 |
| 2009/0064071 A1 | 3/2009 | Siarkowski et al. | |
| 2009/0077542 A1 | 3/2009 | Chou et al. | |
| 2010/0095179 A1 | 4/2010 | Wen et al. | |
| 2011/0016326 A1 | 1/2011 | Craig et al. | |
| 2011/0077893 A1 | 3/2011 | Ito | |
| 2011/0252393 A1 | 10/2011 | Sripada et al. | |
| 2012/0042294 A1 | 2/2012 | Sarwary | |
| 2016/0300009 A1 | 10/2016 | Sarwary et al. | |
| 2018/0121585 A1 | 5/2018 | Cherupalli et al. | |
| 2018/0307788 A1 * | 10/2018 | Pradeep | G06F 30/30 |
| 2019/0266303 A1 * | 8/2019 | Pradeep | G06F 30/398 |

* cited by examiner

FALSE PATH TIMING EXCEPTION HANDLER CIRCUIT

CROSS-REFERENCE TO RELATED APPLICATION

This application is a continuation of U.S. patent application Ser. No. 15/630,394, filed Jun. 22, 2017, which claims the benefit of India Provisional Patent Application 201741014004 filed on Apr. 20, 2017, and entitled FALSE PATH TIMING EXCEPTION HANDLER CIRCUIT, the entirety of both are incorporated by reference herein.

TECHNICAL FIELD

This disclosure relates to electrical circuits, and more particularly to a gating circuit that selectively disables a designated false circuit path during testing of valid timing paths in a circuit under test.

BACKGROUND

The higher clock frequencies and smaller geometry sizes in today's integrated circuits have led to an increase in speed related defects which are commonly referred as transition delay faults. Thus, it is desirable that the devices are screened for such faults using at-speed testing. Effective scan-based at-speed test techniques are available in leading automated test pattern generator (ATPG) tools. The most common at-speed tests to check for manufacturing defects and process variations include test patterns created for the transition and path-delay fault models.

While creating at-speed test patterns, it is desirable to account for timing exceptions and constraints such as false and multi-cycle paths. If these paths are not handled correctly during scan-based at-speed test pattern generation, it can lead to lower test quality by failing otherwise passing chips on the tester which reduces product yield. False Paths are those timing arcs in design where changes in source registers are not expected to be captured by the destination register within a particular time interval. False Paths can be categorized under various design topologies such as a) static false path—timing arc in design where excitation of source register will not have any impact or change in destination register, b) False reset timing arc, or c) asynchronous false path (e.g., core data register (CDC) Path)—where clock domain of the source register is asynchronous to the clock domain of the destination register and then the path is considered as asynchronous. A multi-cycle path in a sequential circuit is a combinational path which does not have to complete the propagation of the signals along the path within one clock cycle. For a multi-cycle path of N, a given design should ensure the signal transition propagated from source to destination occurs within N clock cycles.

Typically a false path in a circuit is not activated because of the circuit functionality and delay values of the circuit components. However, a scan-in operation during scan-based at-speed test can load in nonfunctional states, which may sensitize these paths. Such patterns may eventually fail on silicon as these paths are not timing closed in station. This may cause a passing chip to be branded as a defective chip and hence resulting in yield loss.

In order to avoid such scenario, the source of a false/multi-cycle path can be marked as a dynamic 'X' (unknown value) source in the ATPG. In case of designs using scan compression, the ATPG coverage can be severely degraded in the presence of increased density 'X' sources and it could potentially impact the effective achievable compression. The X-sources can limit both unload compression by masking observation, and the load compression by requiring additional care bits to prevent Xs or avoid their effect on unload data. Failure in effective handling of X-sources might impact the observability of the other non-X scan cells and can potentially inflict lower test coverage and increase in pattern count.

SUMMARY

This disclosure relates to a gating circuit that selectively disables a designated false path during testing of valid timing paths in a circuit under test.

In one example, a circuit includes a false circuit path in a circuit under test having a starting logic point to an end logic point of the path. The false circuit path is designated as a testing path to be excluded during testing of one or more valid timing paths of the circuit under test. A false path gating circuit gates the starting logic point to the end logic point of the false circuit path. The false path gating circuit disables the false circuit path in response to one or more gating controls asserted during the testing of the one or more valid timing paths of the circuit under test.

In another example, a circuit includes one or more valid timing paths in a circuit under test. The valid timing paths are tested under static conditions and at maximum clock speeds for the circuit under test. One or more false circuit paths in the circuit under test have a starting logic point and an end logic point of each path. The false circuit paths are tested under static conditions and at slower clock speeds than the maximum clock speeds for the circuit under test. At least one false path gating circuit is associated with each false circuit path to gate the starting logic point to the end logic point of each false circuit path. The false path gating circuit in each false circuit path enables or disables the respective false circuit path in response to one or more gating controls asserted during the testing of the one or more valid timing paths of the circuit under test. A test circuit generates the gating controls to the false path gating circuits in response to one or more signals received from automatic test equipment.

In yet another example, a method includes disabling false circuit paths in a circuit under test during transition fault testing (TFT) of valid timing paths of the circuit under test. The method includes testing the false circuit paths at slower clock speeds than the clock speed of the valid timing paths during TFT of the false circuit paths. The method includes testing the false circuit paths and the valid timing paths under static conditions to facilitate testing of the circuit under test.

DETAILED DESCRIPTION

Figure 1:
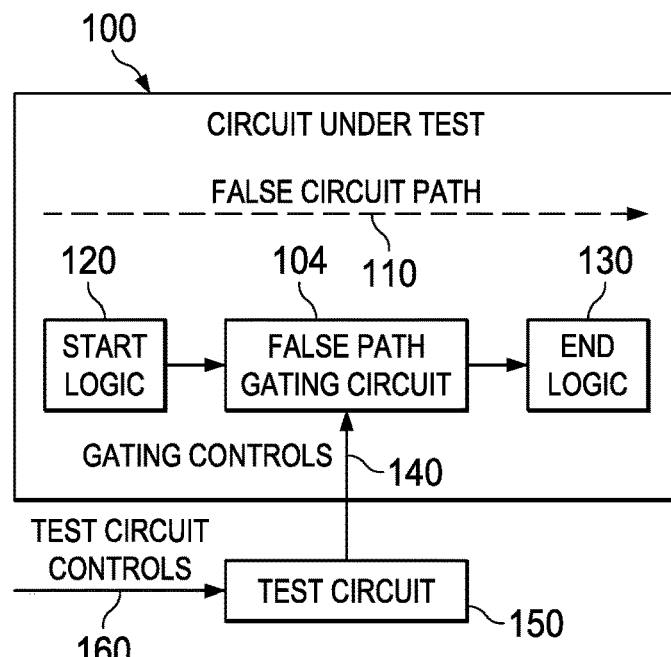
FIG. 1 illustrates an example block diagram of a circuit under test where a false path gating circuit is employed to control the operation of a false circuit path.

This disclosure relates to a gating circuit that selectively disables a designated false circuit path during testing of valid timing paths in a circuit under test. False circuit paths exist in circuits under test where the false path cannot be tested according to the same timing constraints as a valid timing path in the circuit under test. For example, false circuit paths may not be able to be tested at maximum clock speed or can be subject to some other constraint such as multi-cycle testing where the path is tested at some number of clocking transitions that are different that the valid timing path. The false paths can be defined by a starting point and an end point and often times are connected to one or more other full testing paths which can be delay fault tested at speed. Delay fault testing refers to causing a state transition in the path and detecting whether or not the transition occurred within a predetermined timing window. Transitions occurring within the timing window are considered valid whereas transitions occurring outside the timing window are designated as a delay fault.

In previous testing implementations where false paths were encountered, several different techniques were employed to account for the false paths including clock gating, using pattern masks, and using testing constraints (e.g., rules) to guide the ATPG. With respect to clock gating—in this approach, the clock to the source flip-flops (e.g., start point logic) of all false paths is gated via a control gate. During at-speed testing, the enable to this control gate is set to a zero state so as to disable launch transitions from these set of source flops. A drawback of this technique is that it utilizes clock tree separation for the specific subset of flops. This becomes even more challenging when the numbers of source flops are large and scattered across modules where clock divergence can occur. With respect to cell constraint/pattern masks—in this approach, an X cell constraint can be placed on the destination flop (e.g., end point logic). This results in lower test coverage since other valid timing paths that may use the end point logic as a transition capture location would not be testable.

One other technique is the use of testing constraints in the automatic test pattern generator (ATPG). Most ATPG tools have recently developed the capability to read in timing exceptions details and comprehend the exceptions during at-speed test pattern generation. Although the ATPG can handle the false/multi-cycle path effectively, most often it is observed to have a negative impact on the ATPG quality of results (QoR) such as increased pattern count and reduced test coverage, for example. Also, the total mask pattern count is found to significantly increase which in turn can cause an increase in total test-time.

In this disclosure, a circuit includes a false circuit path (or paths) in a circuit under test where the false circuit path includes a starting logic point to an end logic point of the path. Starting and end point logic can include clocked timing circuits such as flip flops or registers but other non-clocked false path circuits are possible as well (e.g., input/output ports). The false circuit path is designated as a testing path to be excluded during testing of one or more valid timing paths of the circuit under test, where valid timing path refers to a circuit that has no timing constraints placed on the circuit when under test. A false path gating circuit is provided that gates the starting logic point to the end logic point of the false circuit path. The false path gating circuit disables the false circuit path in response to one or more gating controls asserted during the testing of the one or more valid timing paths of the circuit under test. The false path gating circuit also allows the false path to be transition tested during other slower speed testing operations of the circuit in response to the gate controls. By controlling the false paths in this manner, false paths that may negatively influence other valid timing paths can be disabled during testing of the valid timing paths. The false path gating circuit then allows the false circuit paths to be tested under differing timing constraints than the full testing paths such that substantially all paths in the circuit under test can be suitably tested.

FIG. 1 illustrates an example of a circuit under test 100 where a false path gating circuit 104 is employed to control the operation of a false circuit path. As used herein, the term "circuit" can include a collection of active and/or passive elements that perform a circuit function, such as an analog circuit or control circuit. Additionally or alternatively, for example, the term "circuit" can include an integrated circuit (IC) where all and/or some of the circuit elements are fabricated on a common substrate (e.g., semiconductor substrate).

The circuit 100 includes a false circuit path 110 having a starting logic point 120 to an end logic point 130 of the path. As used herein, the term "false circuit path" refers to any circuit having a starting point and a destination that cannot be tested under full system timing constraints (e.g., at maximum clock speeds). The false circuit path 110 is designated as a testing path to be excluded during testing of one or more valid timing paths of the circuit under test. As used herein, the term "valid timing path" refers to a circuit that can be tested under maximum clock speeds. A false path gating circuit 104 gates the starting logic 120 to the end logic 130 of the false circuit path 110. The false path gating circuit 104 enables or disables the false circuit path 110 in response to one or more gating controls 140 that are asserted during the testing of the valid timing paths of the circuit under test 100. In one example, the false path gating circuit 104 provides a designated true or false logic state to the end logic 130 in response to the gating controls 140 in order to bias the end logic to a desired state during the testing of the valid timing paths of the circuit under test.

The false path gating circuit 104 can include a multiplexor (or a set of gates providing a multiplexed function) responsive to the gating controls 140 to bias the end point logic 130 to a desired state during the testing of the one or more valid timing paths of the circuit under test 100. In a specific example, the false path gating circuit 140 can include an input gate (see e.g., G1 of FIG. 3) that receives output from the starting logic point 120 at one input and receives a first design for test (DFT) control input at another input to enable or disable the output from the starting logic. The DFT control can be asserted from an internal register or as an external control from automatic test equipment, for example. Also, the false path gating circuit 104 can include an output gate (see e.g., G2 of FIG. 3) that receives output from the input gate at one input and receives a second DFT control input at another input to enable or disable the output from the input gate and to drive the end logic 130 in response to the first and second DFT controls.

A testing circuit 150 in response to various test circuit controls 160 can generate the second DFT control as a gating control 140 to the false path gating circuit 104. The testing circuit 150 can include a test control gate (see e.g., G3 of FIG. 3) that is driven from one or more test control flip flops and a scan mode control bit asserted by an external automatic test equipment (ATE) (not shown) or through internal test generation logic such as Logic BIST (Built-in Self-Test). The test control flip flops can drive multiple false circuit paths or in another example each false circuit path can be driven from a separate test control flip flop. The testing circuit 150 can also include a clock gate (see e.g., CG1 of FIG. 3) to control a clock to the test control flip flops. The clock gate is controlled by a scan enable signal and a transition fault test (TFT) enable control asserted by the external ATE (see e.g., 230 FIG. 2) or internal BIST (not shown). The test circuit controls 160 can include the first and second DFT controls, the scan mode control, and the TFT control and can be asserted in accordance with a generic test protocol, an IEEE 1500-based protocol, or a joint test action group (JTAG) protocol, for example. The logic state of the first and second DFT controls, the scan mode control, and the TFT control enable the false circuit path 110 to operate in at least one of functional circuit mode, in scan shift mode, in stuck-at-capture mode, in slow-speed transition fault test capture mode, and in at-speed transition fault test capture mode (see e.g., Table 1 with respect to discussion of FIG. 3 below). Also, the logic state of the first and second DFT controls, the scan mode control, and the TFT control enable the false circuit path 104 to operate in accordance with transition fault testing protocols such as a launch on extra/ extended shift (LOES) test or a launch off capture (LOC).

Figure 2:
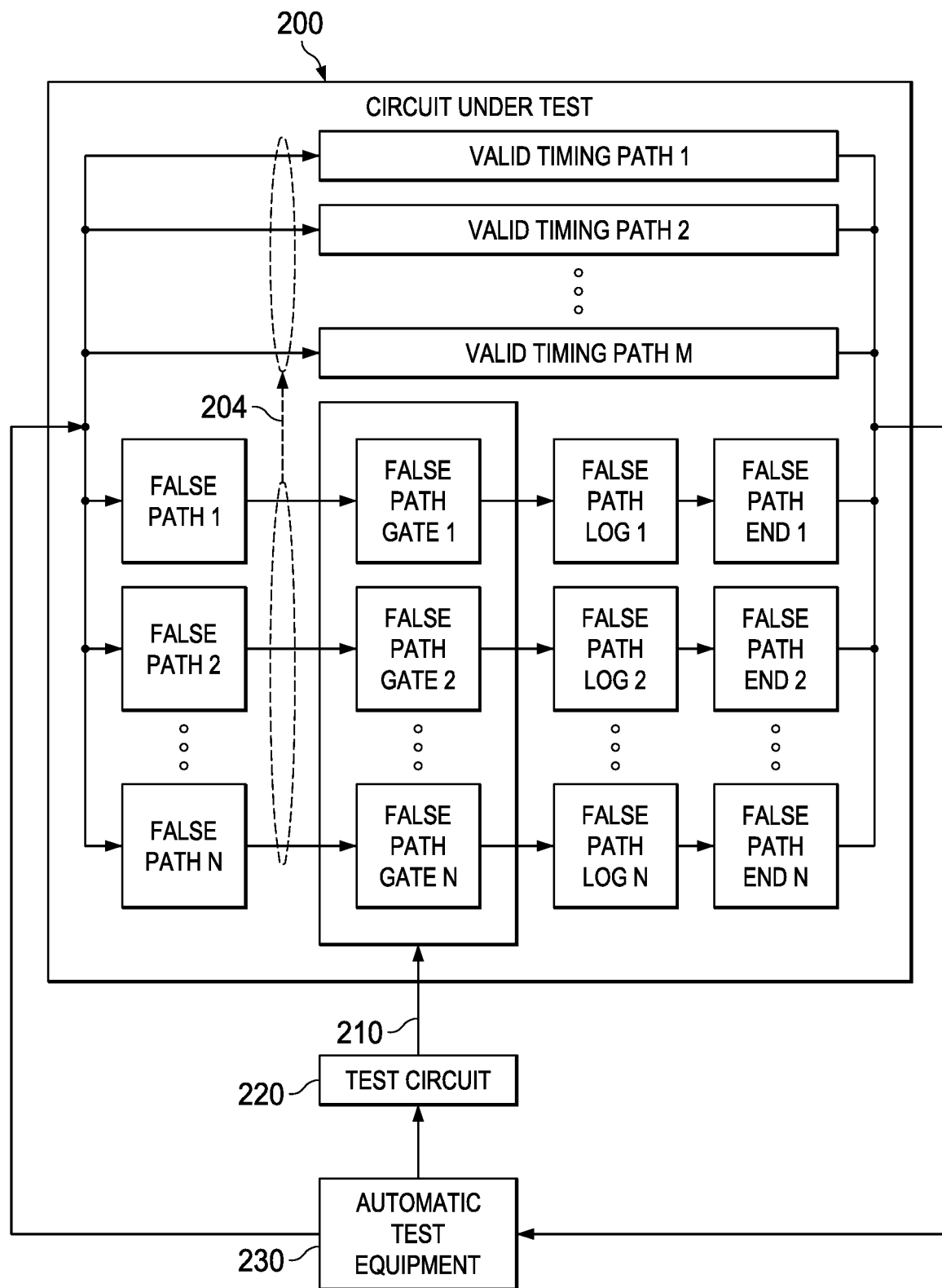
FIG. 2 illustrates an example of a circuit under test where multiple false path gating circuits are employed to control the operation of multiple false circuit paths.

FIG. 2 illustrates an example of a circuit 200 under test where multiple false path gating circuits are employed to control the operation of multiple false circuit paths. The circuit 200 includes one or more valid timing paths which are shown as valid timing paths 1 through M, where M is a positive integer. The valid timing paths 1-M are tested under static conditions and at maximum clock speeds for the circuit under test 200. One or more false circuit paths beginning with starting path logic FPATH 1 through FPATH N in the circuit 200 clocks data from to an end logic point of each path shown as FP END 1 through FP END N, where N is a positive integer. At least one false path gating circuit shown as FP GATE 1 through FP GATE N is associated with each false circuit path to gate the starting logic point to the end logic point of each false circuit path. As shown, the false path circuits can also include other false path logic (e.g., clocked and/or combinatorial logic) shown as FP LOG 1 through FP LOG N that is dispersed between the starting and end point logic in the respective false paths. Also, one or more of the false paths 1-N may also drive one or more valid timing paths 1-M as shown via arrow 204.

The false path gating circuit in each false circuit path enables or disables the respective false circuit path in response to one or more gating controls 210 asserted during the testing of the one or more valid timing paths of the circuit under test. A test circuit 220 generates the gating controls 210 to the false path gating circuits in response to one or more signals received from automatic test equipment 230 (ATE) or internal test generation logic. The ATE 230 drives each of the testing paths and records responses from each path to perform testing. During testing of the valid timing paths, the test circuit 220 disables the false path circuits so that uncertain false path circuit states do not affect the valid timing path testing.

Figure 3:
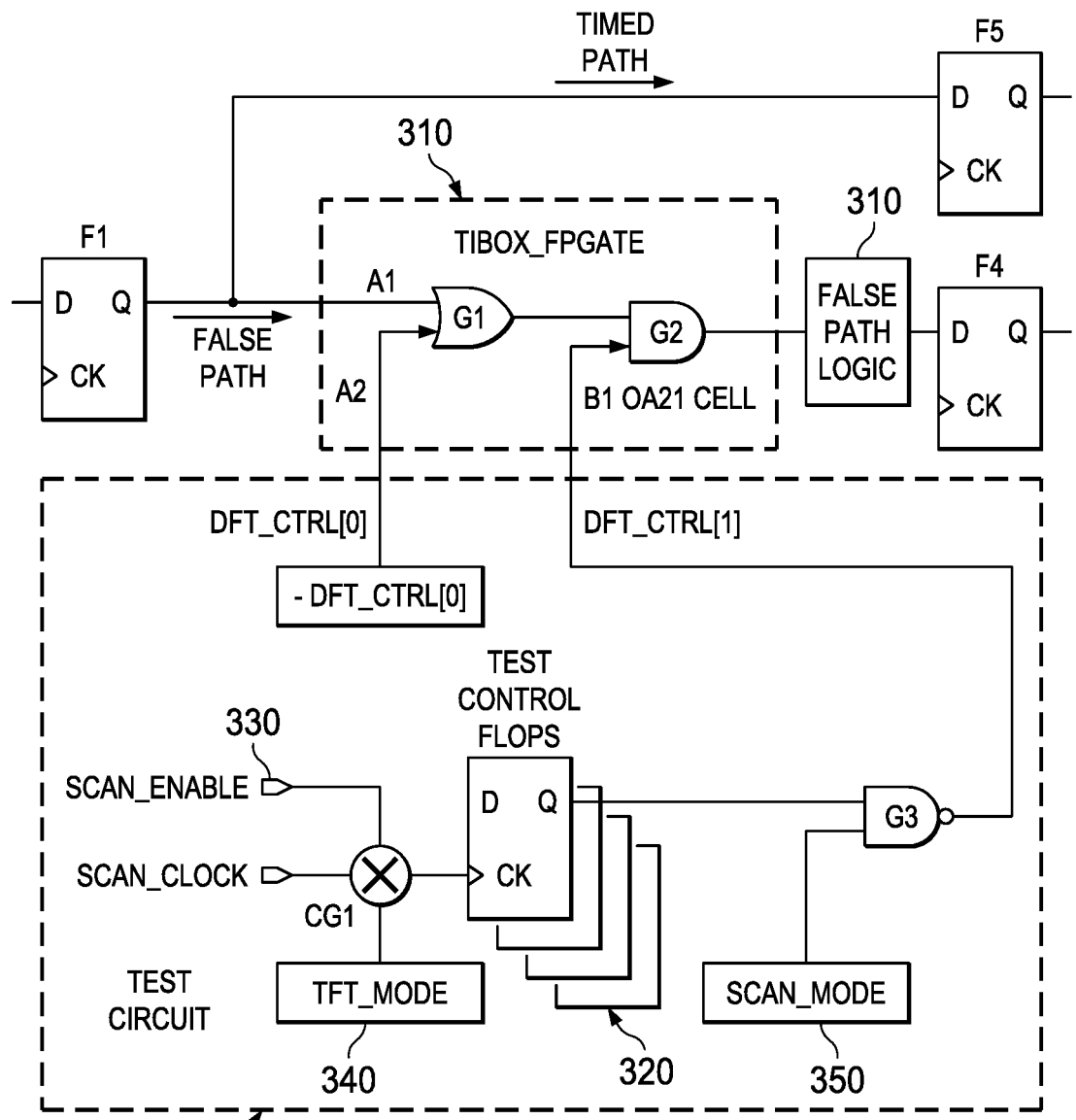
FIG. 3 illustrates an example circuit under test where a false path gating circuit is employed to control the operation of a false circuit path.

FIG. 3 illustrates an example circuit 300 under test where a false path gating circuit 310 is employed to control the operation of a false circuit path. In this example, a false circuit path is shown from starting point flip flop F1 to end point flip flop F4. The flop F1 can drive a valid timing path shown as timed path F1 to F5. Thus, in some examples, starting point logic such as F1 can drive both false circuit paths and valid timing paths. The logic F1 drives the false path gating circuit 310 which in turn drives path logic 310 that connects to end point F4. The false path gating circuit 310 can include gates G1 and G2 in one implementation, and in another implementation, a multiplexor could be employed in place of G1 and G2. The false path gating circuit 310 includes inputs A1 and A2 along with input B1.

The input A2 of the cell 310 is controlled by DFT_CTRL [0] which holds a reset value of zero in functional mode thereby making the gate G1 transparent and in at-speed test mode is programmed to 1 to gate the path from F1 to F4 at the gate G1. The input B1 is controlled by DFT_CTRL [1] signal which holds a reset value of 1 in functional mode to make gate G2 transparent. An additional test-control flop 320 (or flip-flops) can be added to obtain static coverage with stuck-at test and gross delay defect fault coverage with any method of transition fault testing including LOC/LOES-based tests, for example. A single test control flop 320 can be used to drive multiple false path gating circuit enabling area overhead optimization. The clock to the test control flops 320 can be gated via clock gate CG1 based on scan-enable 330 and transition fault test (TFT) mode signal. A scan mode signal 350 controls the other input to G3.

The gating methods also facilitate in covering faults and gross delay defect faults for false paths using regular stuck-at and transition fault tests respectively. The following table (Table 1) represents the various testing modes based on the asserting of the test circuit controls DFT_CTRL[0], DFT_CTRL[1], SCAN_MODE, SCAN_ENABLE, and TFT_MODE which are employed to control the false path gating circuits described herein.

TABLE 1

| Signal | Func | Scan Shift (All modes) | Stuck-At Capture | At-Speed TFT Capture | Slow-Speed TFT Capture |
|---|---|---|---|---|---|
| DFT_CTRL[0] | 0 | 0 | X | 0 | X |
| DFT_CTRL[1] | 1 | X | X | 1 | X |
| SCAN_MODE | 0 | 1 | 1 | 1 | 1 |
| SCAN_ENABLE | 0 | 1 | 0 | 0 | 0 |
| TFT_MODE | 0 | X | 0 | 1 | 0 |

Figure 4:
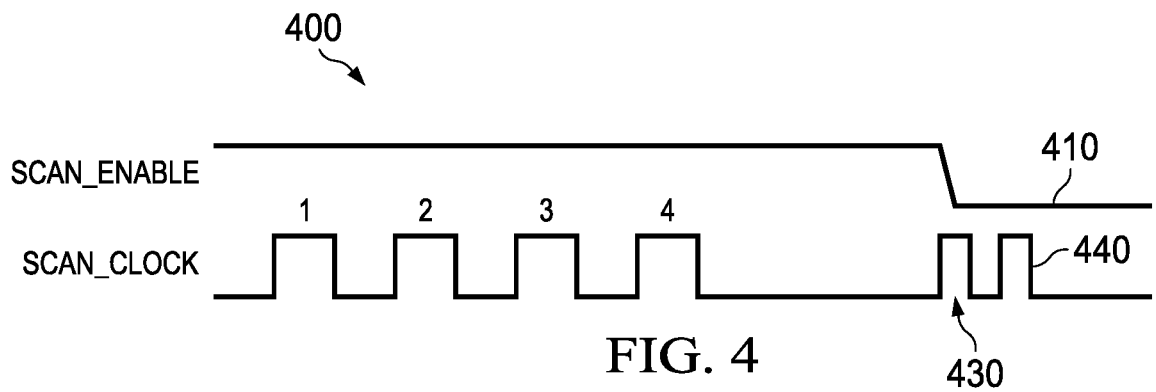
FIG. 4 illustrates an example timing diagram for delay fault testing of a false circuit path.

FIG. 4 illustrates an example timing diagram for delay fault testing of a false circuit path. A timing relationship is shown between a scan enable signal at 410 which triggers a launch on extra/extended shift (LOES) testing described herein when the signal goes from high to low. As noted previously, any transition fault testing an be employed such as launch off capture (LOC) methods, for example. In this example, shift clocks shown as clocks 1-4 are generated to commence a design shift operation. After shifting of desired data values into the design, at least two clock pulses of a test clock can be generated to perform the delay fault testing of the false paths in the circuit under test. One clock pulse 430 launches a transition timing operation and a second clock pulse 440 clocks a capture of the output transition for a respective path.

Figure 5:
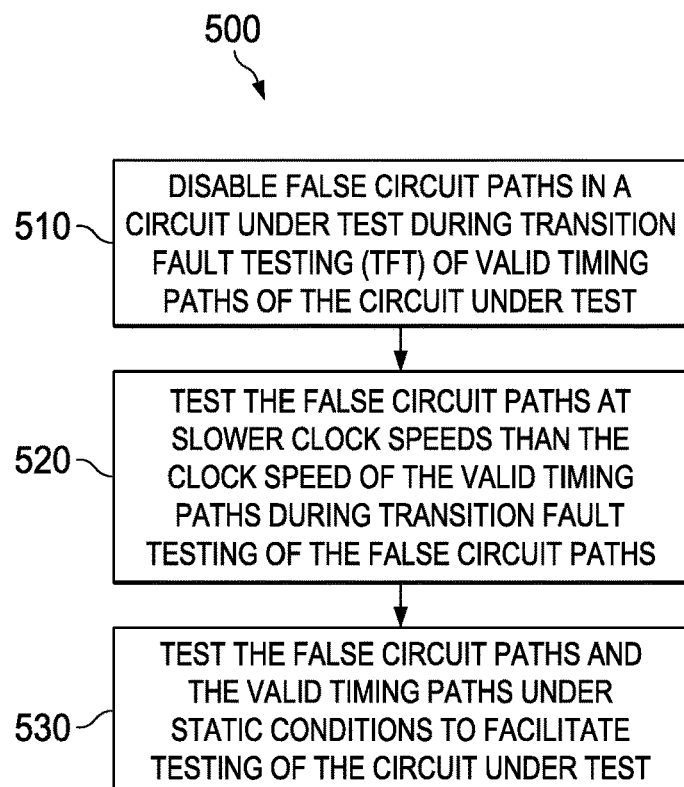
FIG. 5 illustrates an example method to control the operation of a false circuit path.

In view of the foregoing structural and functional features described above, an example method will be better appreciated with reference to FIG. 5. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured as machine readable instructions stored in memory and executable in an integrated circuit or a processor, for example.

FIG. 5 illustrates an example method 500 to control the operation of a false circuit path. At 510, the method 500 includes disabling false circuit paths in a circuit under test during transition fault testing (TFT) of valid timing paths of the circuit under test (e.g., via false path gating circuit 104 of FIG. 1). At 520, the method 500 includes testing the false circuit paths at slower clock speeds than the clock speed of the valid timing paths during TFT of the false circuit paths (e.g., via false path gating circuit 104 and test circuit 150 of FIG. 1). At 530, the method 500 includes testing the false circuit paths and the valid timing paths under static conditions to facilitate testing of the circuit under test Although not shown, the method can also include biasing the false circuit paths to a predetermined logic level during the TFT of the valid timing paths.

What have been described above are examples. It is, of course, not possible to describe every conceivable combination of components or methodologies, but one of ordinary skill in the art will recognize that many further combinations and permutations are possible.

Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method, comprising:
   disabling circuit paths in a circuit under test during transition fault testing (TFT) of valid timing paths of the circuit under test;
   testing the circuit paths at slower clock speeds than the clock speed of the valid timing paths during TFT of the circuit paths; and
   testing the circuit paths and the valid timing paths under static conditions to facilitate testing of the circuit under test.

2. The method of claim 1, further comprising biasing the circuit paths to a predetermined logic level during the TFT of the valid timing paths.

* * * * *